United States Patent [19]

Shimamoto et al.

[11] 4,275,321
[45] Jun. 23, 1981

[54] DRIP-PROOF TYPE ELECTRICAL ROTATING MACHINE

[75] Inventors: Koji Shimamoto, Chiba; Mitsuo Shimizu, Sakura; Takao Yamashita, Narashino, all of Japan

[73] Assignee: Hitachi, Ltd., Tokyo, Japan

[21] Appl. No.: 936,132

[22] Filed: Aug. 23, 1978

[51] Int. Cl.³ .............................................. H02K 9/02
[52] U.S. Cl. ........................................ 310/59; 310/63
[58] Field of Search ...................... 310/58, 52, 62, 54, 310/63, 65, 53, 59, 88, 60

[56] References Cited

U.S. PATENT DOCUMENTS

| | | | |
|---|---|---|---|
| 1,428,889 | 9/1922 | Johnson | 310/63 |
| 1,921,140 | 8/1933 | Smith | 310/63 |
| 2,347,517 | 4/1944 | Smalley | 310/63 |
| 2,488,409 | 11/1949 | Hubscher | 310/63 |
| 3,749,953 | 7/1973 | Baumann | 310/62 |
| 3,761,748 | 9/1973 | Baumann | 310/62 |

FOREIGN PATENT DOCUMENTS 50-144906  11/1975  Japan ....................................... 310/63

Primary Examiner—R. Skudy
Attorney, Agent, or Firm—Craig & Antonelli

[57] ABSTRACT

Drip-proof type electrical rotating machine having inlets and outlets for air flow formed below a rotating shaft supported by a frame. The inlets are formed on end brackets located at both sides of a stator core, and cooling fans rotating together with the rotating shaft are provided on a rotor in opposite to both of the end brackets. Air guides are provided between the inlet and the cooling fans, each air guide being provided with an air passing hole. When the air guide is assembled into the frame, the distance from the axis of the rotating shaft to an above edge of the air passing hole is shorter than the distance from the shaft axis to an lower edge of the air passing hole. With such a construction, the upper edge portion of each air passing hole above the rotating shaft substantially prevents air taken-in from backwardly flowing out therethrough, and the lower edge portion under the shaft permits an effective air suction therethrough from the inlet, thus resulting in improvement of cooling effect of the rotating machine.

5 Claims, 3 Drawing Figures

DRIP-PROOF TYPE ELECTRICAL ROTATING MACHINE

FIELD OF THE INVENTION

The invention relates to a drip-proof open type electrical rotating machine of which the rotating shaft is laterally disposed in practical use and, more particularly, an electrical rotating machine in which inlet for air flow are disposed on end brackets located at both sides of a stator core in the axial direction and an outlet is disposed on a frame between the inlets.

DESCRIPTION OF THE PRIOR ART

There has been known an electrical rotating machine of the type in which an inlet is provided on one end bracket located at one side of a stator core and an outlet is provided on the other bracket located at the other side of the stator core and air taken in-from the inlet is exhausted from the outlet through the inside or the outside of the stator core. This type of rotating machine is defective in that the stator coil end near the outlet is insufficiently cooled. Cooling air passing the stator coil end near the inlet is cold but it progressively flows absorbing heat emanating from the stator coil at the inlet side, a rotor core, a stator core and the like and when reaching near the stator coil end at the outlet side, the air is sufficiently heated. For this, the stator coil end at the outlet side is insufficiently cooled.

In this connection, the invention disclosed by Japanese Utility Model Publications No. 34-12022 and No. 50-144906 have successfully solved the above-mentioned disadvantage by disposing inlets at both sides of the stator core.

In this type electrical rotating machine, the outlet is disposed between the inlets, and air guides are each provided between the inlet and the outlet, and air guides for guiding air sucked from the inlet to the suction side of the cooling fan and further to the neighborhood of the stator coil end are provided. Each air guide is provided at the center with an air passing hole. Generally, the cooling effect of this type machine is better as the amount of airflow is larger. It is for this reason that, in the conventional electrical rotating machine, the diameter of the air passing hole is so selected as to be slightly smaller than the diameter of the cooling fans. The air passing hole is circular and disposed the center being coincident with the axis of the rotating shaft, when the air guides are assembled.

In the drip-proof open type electric rotating machine, the inlet and outlet are disposed below the rotating shaft to ensure a drip-proof and dust protection. Accordingly, air entered from the inlet provided at the lower part of the frame passes through the air passing hole and reaches the vicinity of the cooling fans. Most of the air flowed into the space in the vicinity of the outlet through the air passing hole, absorbs heat emanating from the stator coil end and flows out from the outlet, without little circulation thereof along the inner surface of the housing. However, most of the air flowed into the space behind the terminal part of the outlet in the frame flows along the inner surface of the housing, absorbing heat from the stator coil end, and flows out from the outlet.

In order to observe air-flow in the machine, an experiment was conducted by the inventors of the present invention. In the experiment, the frame was made by transparent plastic and the stator core, the stator coil, the rotational shaft, the rotor, the cooling fans and the air guides are assembled into the transparent plastic frame. Smoke was made to flow into the plastic frame and the air flow was observed by the smoke. From the observation, it was found that the air flowing into the stator core side through the air passing hole partially flows backward to the inlet, through the air passing hole portion located above the rotational shaft. The above counter-flowing air serves to undesirably disturb the sucked air-flow correctly toward the air passing hole. The reason why the counter-flow takes place at the air passing hole portion above the rotational shaft may be considered as follows. The outlet is located under the shaft, so that the pressure at the portion lower the shaft is not high, in contrast with the pressure at the portion above the shaft. In other words, the latter pressure i.e. that pressure at the portion above the shaft becomes higher than the former pressure thereby causing such a counter-flow at the portion above the shaft i.e. at the upper portion of the air passing hole.

Therefore, if such a counter-air flow could be considerably reduced or completely eliminated, the cooling effect of the electrical rotary machine can be further improved. The present invention is based on this assumption.

SUMMARY OF THE INVENTION

An object of the invention is to provide a electrical rotary machine with improved cooling effect and which is provided with a unique air passing hole of an air guide.

Another object of the invention is to provide an electrical rotary machine manufactured at a low cost.

According to the present invention, an air guide is constructed such that the distance from the axis of a rotating shaft of the machine to the edge of the air passing hole portion above the rotating shaft is selected to be shorter than that from the axis to the edge of the air passing hole portion under the shaft. This configuration of the air guide can be realized in such a way that the air passing hole is shaped circular and the center of the circular hole is eccentrically located below the axis of the rotating shaft. This configuration may also be realized when the radius of the air passing hole above the rotating shaft is so selected as to be shorter than that below the rotating shaft.

With such an air passing hole, since the area of the air passing hole under the shaft is larger, a sufficient amount of air may be supplied therethrough to the space including the stator coil. Accordingly, the lower part of the stator coil is sufficiently cooled. Most of the air flowing into the space including the stator coil in the frame is exhausted from the outlet, with little flow thereof along the inner surface of the housing. Therefore, the outstanding counter-flow is almost eliminated. Further, the area of the air passing hole above the shaft is made smaller than the conventional one, so that the counter-flow passing therethrough is much reduced. Accordingly, the turbulent flow produced in the vicinity of an inlet of the air passing hole is also reduced so that the amount of the air flow toward the stator coil through the air passing hole is increased, thus resulting in good cooling of the stator coil.

An experiment was conducted to check the effects of the invention. In the electrical rotary machine used in the experiment, the diameter $d_1$ defined by the distance from the axis of the rotating shaft and to the remotest ends of the cooling fan at the end portion of the fan in the axial direction is 51.5 mm; the diameter $d_2$ defined by the distance from the axis to the nearmost ends of the cooling fan at the end portion of the fan in the axial direction is 31.5 mm; one radius $d_3$ of the rotating shaft is 16 mm and the other radius $d_4$ of the shaft is 17.5 mm. In the experiment, the distance $D_5$ from the axis of the shaft to the edge of the air passing hole located above the shaft and the distance $D_6$ under the shaft are variously changed under the same operating condition of the electrical rotary machine with such physical dimensions, and temperature of the stator coil was measured by a resistance method. The results of the measurement are indicated in Table I. Temperature-rise values in the respective items are each the average of the temperature measurements of ten machines.

TABLE I

| Item | $D_5$ | $D_6$ | Temperature-rise values |
|---|---|---|---|
| 1 | 46 mm | 46 mm | 55.7° C. |
| 2 | 41 | 46 | 51.4 |
| 3 | 41 | 41 | 53.3 |
| 4 | 30 | 46 | 52.2 |
| 5 | 20 | 46 | 55.7 |
| 6 | 30 | 41 | 52.9 |

In item 1, the air passing hole is circular and its radius is slightly smaller than the radius $d_1$ of 51.5 mm and the center of the circle is coincident with the axis of the shaft. This is of conventional type. In item 2, the upper radius or distance $D_5$ of the air passing hole is 41 mm and the lower radius or distance $D_6$ is 46 mm and, as seen from the table, the cooling effect is improved. In item 3, the distances $D_5$ and $D_6$ are equal and the cooling effect is relatively deteriorated in contrast with the case of item 2. The distance $D_5$ in item 2 is larger than the radius $d_2$ and the distance $D_5$ in item 4 is slightly smaller than the radius $d_2$. The temperature-rise in these items is lower than in items 1 and 3. However, when the distance $D_5$ is further smaller as shown in item 5, the temperature-rise is remarkable. In the case of item 5, the difference between the distance $D_5$ and radius $d_4$ is only 2.5 mm, so that it is hardly possible for air to flow into the space including the stator coil through the air passing hole portion located above the shaft, which results in the remarkable temperature-rise.

On the basis of the fact that the result of the item 3 is better than that of the item 1, the radius or distance $D_6$ in item 3 and the radius or distance $D_5$ in item 4 are used and measured of the temperature rise. The measuring result in this case is shown in item 6. The temperature rise in item 6 is lower than that in item 3 but higher than that in item 4.

According to the results of the experiment, it is necessary that the radius or distance $D_6$ is to be slightly less than the radius $d_1$ and the radius or distance $D_5$ is to be less than the radius or distance $D_6$. Further, it will be seen that it is undesirable that the radius or distance $D_5$ approximates to the radius $d_3$ or the radius $d_4$. A satisfactory effect is obtained when the distance $D_6$ is less than the $d_1$ radius, the distance $D_5$ is larger than the radius $d_2$ and the distance $D_5$ is less than the distance $D_6$. Although not precisely, we can estimate from the experiment that it is satisfactory if the distance $D_5$ is larger than $\frac{1}{2}$ of the sum of the radius $d_4$ and the radius $d_2$ or the radius $d_3$ and the radius $d_2$.

As a matter of course, when the distance $D_6$ is selected larger than the radius $d_1$, air pressure is remarkably reduced and the cooling effect also is deteriorated.

In case that a circular air passing hole with the radius 43 mm is used and the center of the circular hole is located 3 mm below the axis of the shaft, the temperature-rise measured was 51.8° C.

Other objects and features of the present invention will be apparent from the following description taken in connection with the accompanying drawings, in which:

BRIEF DESCRIPTION OF THE DRAWINGS

Throughout the drawings, corresponding parts are given the same reference numerals, and directions such as "clockwise" and "rightward" refer to the invention as viewed in the respective drawings.

DESCRIPTION OF THE PREFERRED EMBODIMENTS

Figure 1:
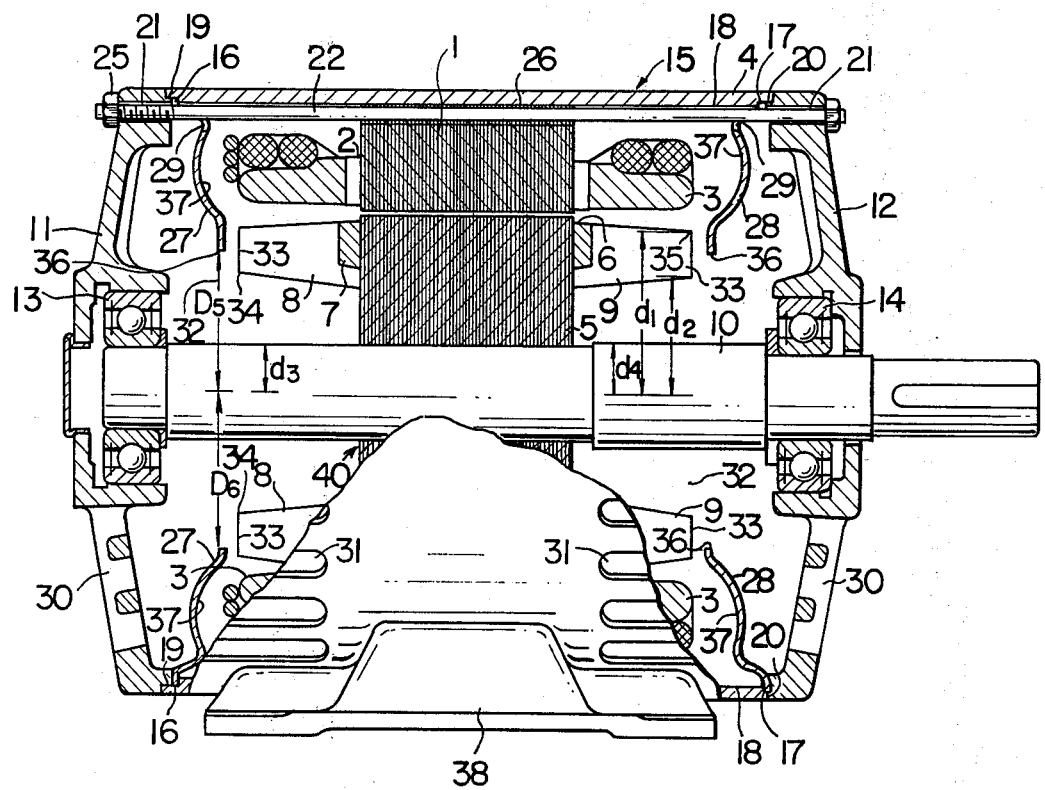
FIG. 1 shows a partial and longitudinal sectional view of an electrical rotating machine according to the present invention.
Figure 2:
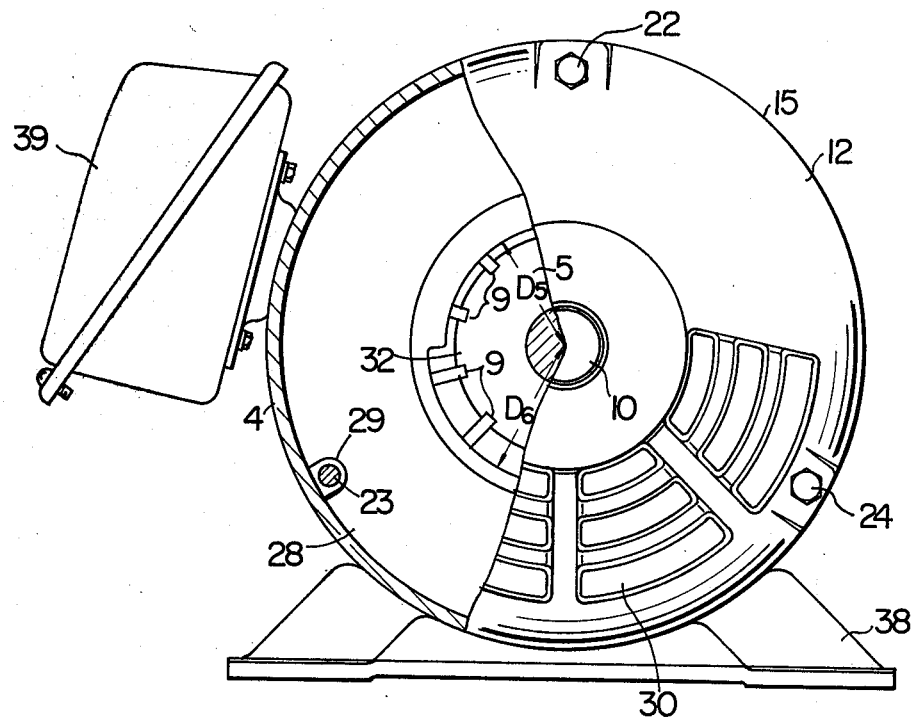
FIG. 2 shows a partial and cross sectional view of the rotating machine shown in FIG. 1.
Figure 3:
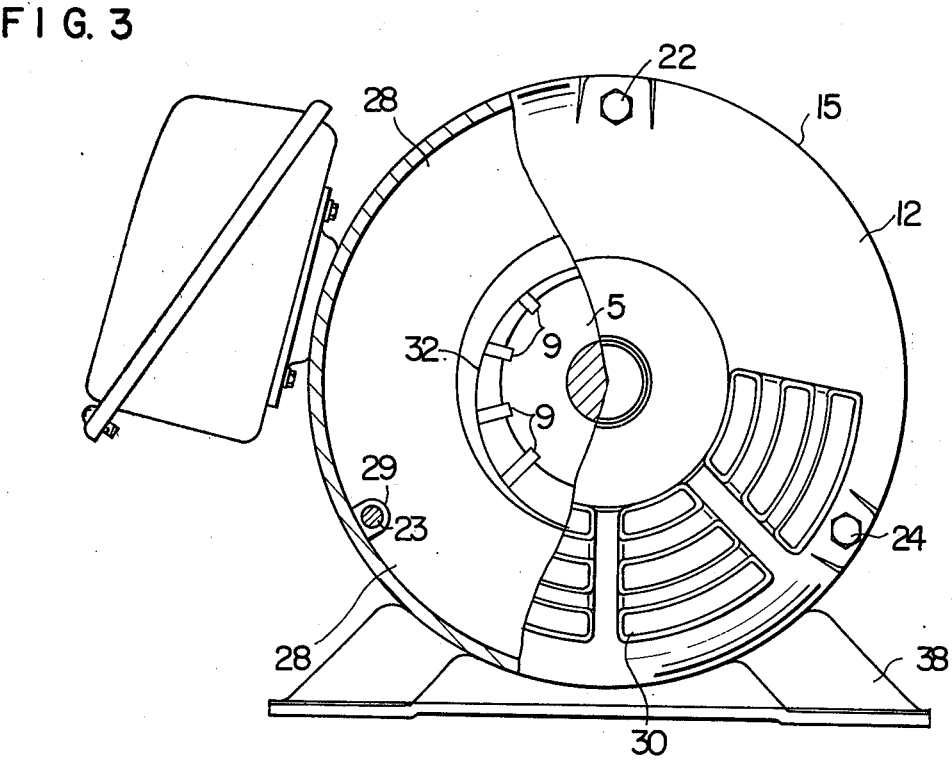
FIG. 3 shows a partial and cross sectional view of another embodiment of the electrical rotating machine according to the invention.

Reference is made to FIGS. 1 and 2, according to these figures, reference numeral 1 designates a stator core comprised of a number of multi-layered punched plates. The stator core 1 is provided with a number of slots 2. A stator core 3 is so mounted in the slots 2 that a rotary magnetic field is developed. The peripheral outer surface of the stator core 1 is tightly fitted onto a tubular housing 4 and is fixed thereto. A tubular rotor core 5 is comprised of a number of multi-layered punched plates. A number of slots 6 are formed near the peripheral outer surface of the rotor core 5. Aluminum is inserted into the slots to thereby form a squirrel cage winding 7. The rotor core 5 is provided at both end surfaces with cooling fans 8 and 9 of which the extreme ends extend along the axis of the rotor core 5 and which are formed integrally with the squirrel cage winding 7. The rotor core 5 is fixedly coupled with a shaft 10 so as to prevent the rotor core from sliding around the shaft 10. The shaft 10 is rotatably received at both ends by bearings 13 and 14 fitted in the central parts of end brackets 11 and 12 fixed at both ends of the housing 4. A frame generally designated by the reference numeral 15 is comprised of the housing 4 and the end brackets 11 and 12. The inner diameters of the surfaces 16 and 17 of both ends of the housing 4 are formed larger than the inner diameter of the remaining surface 8 of the housing 4 in order that, when the end brackets 11 and 12 are fitted into the ends of the housing 4, the inner surfaces 16 and 17 of the ends of the housing 4 respectively are tightly in contact with the outer or peripheral surfaces 19 and 20 of the L-shaped portions of the end brackets 11 and 12. The end brackets 11 and 12 each are provided with three through holes 21 which are equiangularly disposed thereon. FIG. 1 illustrates only one through-hole for easy of illustration. In assembling, the end brackets 11 and 12 are fitted into the housing 4 in such manner that these three through-holes 21 of the end brackets 11 and 12 are correspondingly aligned to each other. Then, long bolts 22 to 24 are inserted through the through-holes aligned of the end brackets 11 and 12 and nuts 25 are screwed around threaded ends of the bolts. In this manner, the end brackets 11 and 12 are fixed to the housing 4. Cut-away portions or grooves 26 are formed on the outer surface of the stator core 1, being equiangularly disposed therearound. The inserted bolts 22 to 24 are fitted in the grooves 26. In FIG. 1, only one groove 26 is illustrated. The shaft 10 is supported horizontally or substantially horizontally. A couple of air guides 27 and 28 are provided and each air guide is fixedly sandwiched between the housing 4 and the end brackets 11 and 12. The end brackets 11 and 12 are provided with inlets 30 for sucking air from the exterior of the machine into the housing 4 by means of cooling fans 8 and 9. As shown in FIGS. 1-3, inlets 30 are located under the shaft 10. The housing 4 has an outlet 31 formed under the shaft 10. The air guides 27 and 28 are disposed between the inlets 30 and the outlet 31. The air guides 27 and 28 have holes 32 (FIGS. 2, 3) permitting air to pass therethrough, respectively. When the air guides 27, 28 are assembled into the frame 15, the holes 32 are positioned around the shaft 10 in such a way that the distance $D_5$ from the axis of the shaft 10 to the upper edge of the hole 32 is less than the distance $D_6$ from the shaft axis to the lower edge of the hole 32. The distance $D_5$ is so selected to be slightly less than the distance $d_1$ from the shaft axis to the remotest end 35 of the extreme end face 33 of the cooling fan 8 and 9. In assembling, the lower edge 36 of each air guide which partially defines the hole 32 is located near the end face 33 of the cooling fan 8 and 9. Each air guide 27, 28 is curved at the portion confronting the coil end of the stator winding 3 so as to depart away from the coil end. Holes 29 are formed for the purpose of the locations of the air guides 27 and 28 through which the bolts 22 pass when the air guides are assembled into the housing 4. In FIGS. 2 and 3 the numeral 38 designates a base fixed at the lower portion of the housing, the numeral 39 designates a terminal box for receiving terminals connected to the stator winding.

With such a construction, when the stator winding 3 is powered from a power source (not shown), the rotor generally designated by reference numeral 40 starts to rotate. With the rotation of the rotor, the cooling fans 8 and 9 also rotate so that air is taken from exterior into the space between the end brackets 11, 12 and the air guides 27 and 28, through the inlets 30. And the air taken-in flows toward the stator coil 3 through the air passing holes 32. Most of air flowing toward the lower space under the shaft 10 through the holes 32, absorbs heat emanating from the lower part of the stator coil 3 and flows out to exterior through the outlets 31, with little circulation of the air around the inner surface of the housing 4. In constant, most of the directed toward the upper space above the shaft 10 through the holes 32 flows along the inner surface of the housing 4 toward the outlet 31. As previously stated, the distance $D_5$ is less than that the distance $D_6$, that is to say, the upper edges 36 of the air guides 27 and 28 above the shaft 10 are more extended that the lower edges 36 under the shaft 10. Therefore, little air inversely flows through the upper edges of the holes 32 toward the end brackets 11 and 12. In other words, most of the air flowing into the upper space above the shaft 10 is directed along the inner surface of the housing 4 toward the outlet 31 and flows out therethrough.

Another embodiment of the electrical rotating machine according to the invention, which is shown in FIG. 3, is characterized in that the air passing holes of the air guides are each circular and, in assembling, the air guides are so mounted that the circular holes are downwardly eccentric with respect to the axis of the shaft 10, as shown. The remaining portions of the FIG. 3 embodiment are substantially the same as those in the embodiment shown in FIGS. 1 and 2.

We claim:

1. A drip-proof type electrical rotary machine comprising:
    a housing;
    a rotor core disposed in said housing;
    a rotating shaft fixed integrally with said rotor core;
    cooling fans disposed at both end sides of said rotor core for rotating with said rotating shaft;
    a stator core disposed confronting said rotor core with a gap therebetween;
    a frame for supporting said stator core so as not to be rotated and for rotatably supporting said rotating shaft, said frame including end brackets adapted to be disposed at respective sides of the stator core;
    an air outlet disposed at the lower portion of said frame below said rotating shaft;
    air inlets disposed at the lower portion of said end brackets below said rotating shaft and at both sides of said outlet;
    air guides disposed in said housing between one of said air inlets and said air outlet and further between one of said cooling fan and said air inlet; and
    an air passing hole formed in each of said air guides for surrounding said rotating shaft in such a way that a distance from a longitudinal center axis of said rotating shaft to an upper edge of said air passing hole located above said rotating shaft is less than a distance from the center axis of the rotating shaft to a lower edge of said air passing hole below said rotating shaft so that the upper edge of each air passing hole substantially prevents a drawn in air from backwardly flowing out therethrough and the lower edge permits an effective air suction through the air passing from the air inlets.

2. A drip-proof type electrical rotary machine comprising:
    a rotor core;
    a rotating shaft fixed integrally with said rotor core;
    cooling fans disposed at both end sides of said rotor core for rotating with said rotating shaft;
    a stator core disposed confronting said rotor core with a gap therebetween;
    a housing for supporting said stator core;
    a pair of end brackets adapted to be fitted onto respective end faces of said housing for rotatably supporting said rotating shaft;
    air inlets disposed below said rotating shaft supported by said end backets;
    air outlets disposed at a lower portion of said housing and at both sides of said stator core;
    air guides disposed in said housing between one of said air inlets and said air outlet and further between one of said cooling fans and said air inlet; and
    an air passing hole formed in each of said air guides for surrounding said rotating shaft in such a way that a distance from a longitudinal center axis of said rotating shaft to an upper edge of said air passing hole disposed above said rotating shaft is less than a distance from the center axis of the rotating shaft to a lower edge of said air passing hole disposed below said rotating shaft so that the upper edge of each air passing hole substantially prevents drawn-in air from backwardly flowing out therethrough and the lower edge permits an effective air suction through the air passing hole from the air inlets.

3. A drip-proof type electrical rotary machine according to claim 2, in which a distance from the center axis of said rotating shaft to the edge of said air passing hole is less than a distance from the center axis of the rotating shaft to remotest ends of said cooling fans at the end portion of the fan in the axial direction but greater than a distance from the center axis of the rotating shaft to nearmost ends of said cooling fans at the end portion of the fan in the axial direction.

4. A drip-proof type electrical rotary machine according to claim 2, in which a distance from the center axis of said rotating shaft to the lower edge of said air passing hole below said rotational shaft is less than a distance $d_1$ but greater than a distance $d_2$, and the distance from the center axis of the rotating shaft to the upper edge of the air passing hole above said rotational shaft is greater than one half of the sum of distances $d_3$ and $d_2$ or $d_4$ and $d_2$, where:

$d_1$ is a distance from the center axis of the rotating shaft to remotest ends of said cooling fans, at an end portion of the fan in the axial direction;

$d_2$ is a distance from the center axis of the rotating shaft to nearmost ends of said cooling fans, at the end portion of the fan in the axial direction;

$d_3$ is a first radius of said rotating shaft; and $d_4$ is a second radius of said rotating shaft.

5. A drip-proof type electrical rotary machine according to claim 2, in which said air passing holes are each shaped in the form of a circle and a center of the respective circular air passing holes is eccentrically located below the center axis of said rotating shaft.

* * * * *